Figure 5:
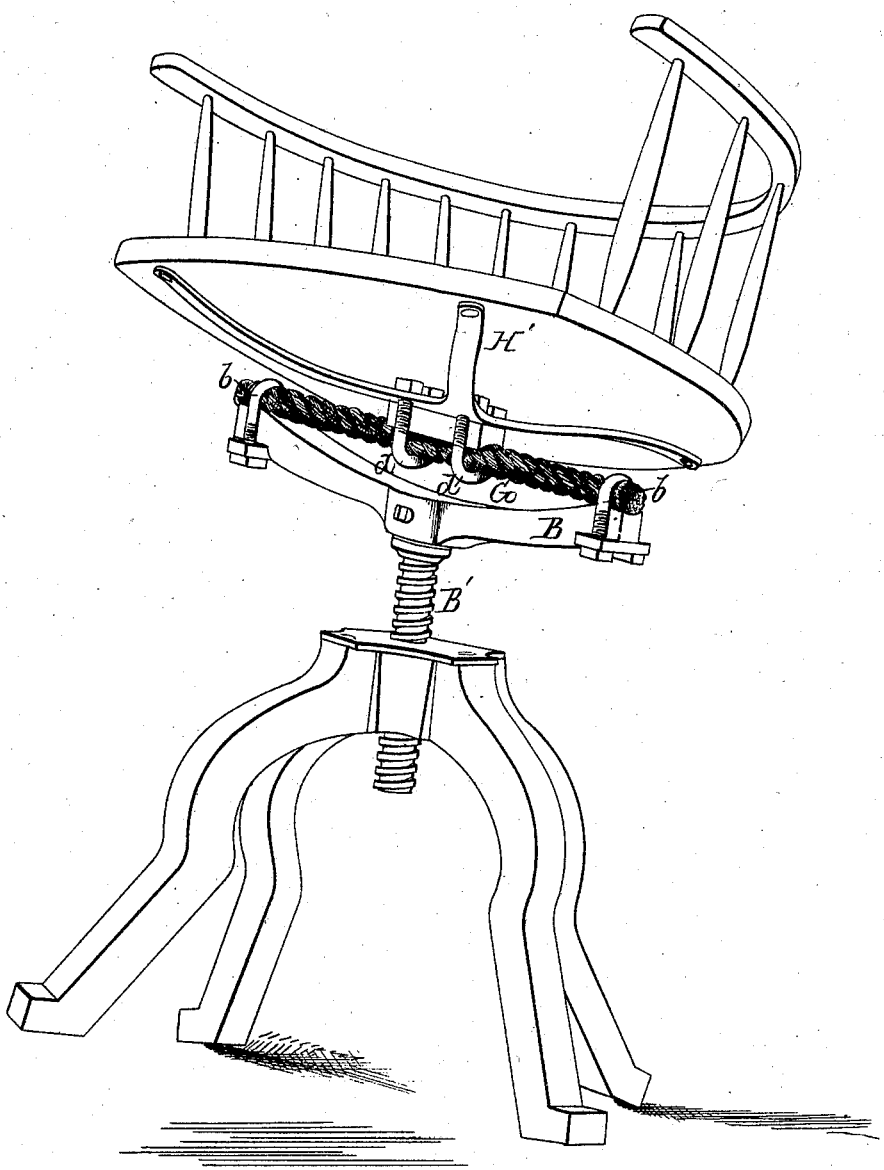

C. KILBURN.
Springs for Seats.
No. 203,739. Patented May 14, 1878.
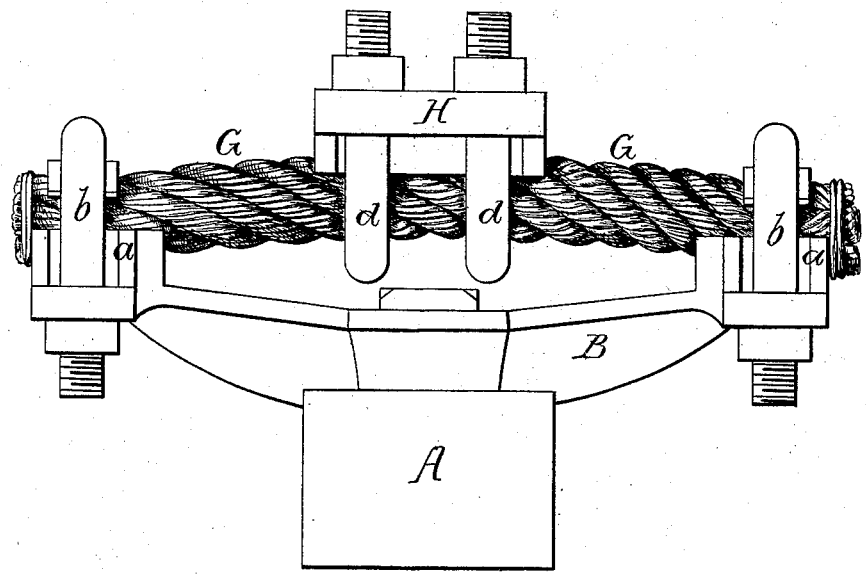
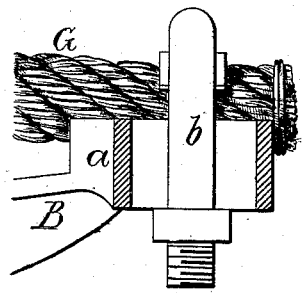
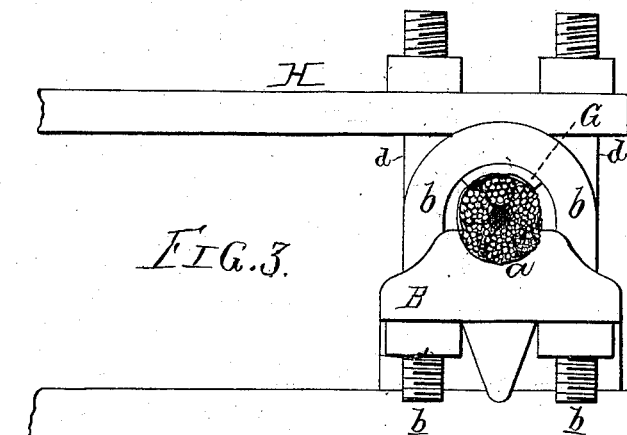
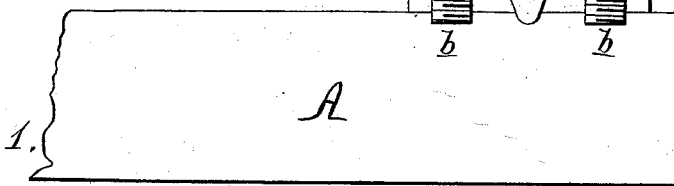
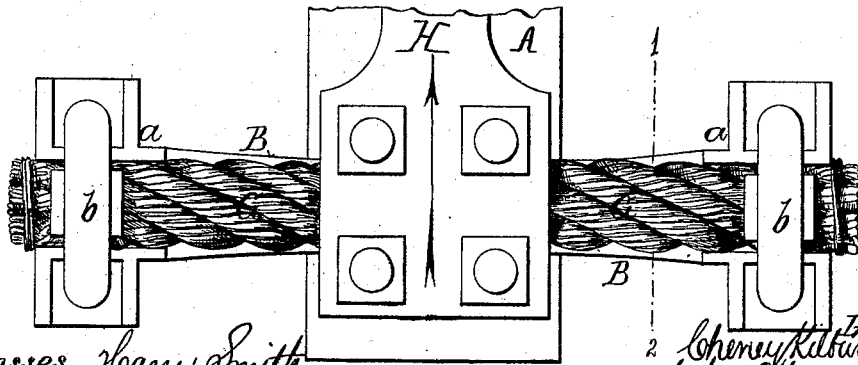

2 Sheets—Sheet 2.

C. KILBURN.
Springs for Seats.

No. 203,739. Patented May 14, 1878.

UNITED STATES PATENT OFFICE.

CHENEY KILBURN, OF PHILADELPHIA, PENNSYLVANIA, ASSIGNOR TO THE HALE & KILBURN MANUFACTURING COMPANY, OF SAME PLACE.

IMPROVEMENT IN SPRINGS FOR SEATS.

Specification forming part of Letters Patent No. 203,739, dated May 14, 1878; application filed March 29, 1878.

*To all whom it may concern:*

Be it known that I, CHENEY KILBURN, of Philadelphia, Pennsylvania, have invented a new and useful Improvement in Springs, of which the following is a specification:

The object of my invention is to make wire rope available as a spring for seats, vehicles, and other purposes by combining a piece of such rope with certain griping devices described hereinafter, through the medium of which torsion may be applied to the rope under pressure on the said devices, the rope tending to recoil when the pressure or load is removed.

In the accompanying drawing, Figure 1, Sheet 1, is a plan view of a spring made according to my invention; Fig. 2, an elevation of the same looking in the direction of the arrow, Fig. 1. Fig. 3 is a side view; Fig. 4, a modification of part of my invention; and Fig. 5, Sheet 2, a perspective view, illustrating the application of my improved spring to a chair, the latter being tilted so as to expose the under side of the seat and spring.

In Figs. 1, 2, and 3, A represents any fixed object to which the spring has to be attached. It may be part of a chair or of a vehicle, for instance, and to this object is secured a bar, B, preferably of cast-iron, and having at each end a recess or socket, $a$, for the reception of the piece G of wire-rope, which is secured to the bar—near its opposite ends in the present instance—by the staple-like bolts $b\ b$.

H is a movable griping device, consisting, in the present case, of an arm the under side of which is recessed and adapted to the wire-rope, to which it is secured by the bolts $d\ d$.

The spring is now complete, the griping-arm H being secured to the object which has to yield under a load. The seat of a carriage, for instance, may be secured to the said arm, on depressing which the wire-rope will be subjected to such torsion that one portion of the rope on one side of the griping-arm H will have its strands untwisted to a limited extent, the other part of the rope on the opposite side of the said griping-arm having an additional twist imparted to it. When the arm is relieved of its load the strands of the wire-rope will recoil to their original condition.

The rigidity of the spring will depend partly on the size of the rope and partly on its length between the griping-bolts $d$ and griping-bolts $b$, and the legs of the latter may pass through elongated openings in the bar B, so as to be adjusted from or toward the griping-bolts $d$, as the required rigidity of the spring may suggest. (See Fig. 4.)

It will be understood that the griping devices may be altered and modified in accordance with the use to which the spring has to be applied; hence I do not wish to confine myself to the precise construction of the bars B and H and their clamping-bolts; neither is it necessary, in the manufacture of the spring, that the wire-rope shall be held tightly at or near its opposite ends to the object to which it has to be applied, and griped at or near the middle by the object, through the medium of which a load or pressure is caused to apply torsion to the rope, as the torsion may, in some cases, be applied to the opposite ends of the rope while the middle of the same is secured to a fixed object; or pressure may be applied in some cases to both griping devices.

Fig. 5, Sheet 1, shows my invention as so applied to an office-chair that the seat can be rocked by the occupant. In this case the bar B, to which the ends of the rope are griped, is secured to the top of the screw B', common to chairs of this class, and the middle of the rope is griped to a frame, H', having four arms secured to the under side of the chair-seat.

The resistance presented by the rope will be the same whether the seat of the chair is tilted backward or forward, for in both cases one part of the rope is twisted and the other part untwisted, as described above.

It will be seen that in carrying out my invention there must be at least three griping devices; but it will be evident that more than this number may be used—as, for instance, in making a spring for a long seat.

I claim as my invention—

A spring in which a wire-rope is combined with three or more griping devices, substantially in the manner described, so that, on subjecting the said rope to torsion by means of the said griping devices, one portion will always be partly untwisted while another is twisted tighter, as specified.

In testimony whereof I have signed my name to this specification in the presence of two subscribing witnesses.

CHENEY KILBURN.

Witnesses:
HARRY A. CRAWFORD,
HARRY SMITH.